(12) United States Patent
Utsumi et al.

(10) Patent No.: US 9,547,288 B2
(45) Date of Patent: Jan. 17, 2017

(54) INFORMATION PROCESSING APPARATUS AND METHOD FOR CONTROLLING THE SAME

(71) Applicant: CANON KABUSHIKI KAISHA, Tokyo (JP)

(72) Inventors: Yuichi Utsumi, Yokohama (JP); Shozo Yamasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 849 days.

(21) Appl. No.: 13/733,662

(22) Filed: Jan. 3, 2013

(65) Prior Publication Data

US 2013/0204400 A1    Aug. 8, 2013

(30) Foreign Application Priority Data

Feb. 6, 2012  (JP) .................................. 2012-022838

(51) Int. Cl.
*G05B 15/02* (2006.01)
*G03G 15/00* (2006.01)

(52) U.S. Cl.
CPC ........... *G05B 15/02* (2013.01); *G03G 15/5004* (2013.01)

(58) Field of Classification Search
CPC .. G05B 19/0426; G05B 19/042; G05B 19/045
USPC .......................................................... 700/14
See application file for complete search history.

(56) References Cited

U.S. PATENT DOCUMENTS

| 5,815,409 | A | 9/1998 | Lee | |
|---|---|---|---|---|
| 6,445,090 | B1* | 9/2002 | Mori | H01H 13/568 200/524 |
| 6,621,994 | B1* | 9/2003 | Yamada | G07F 17/26 399/88 |
| 6,968,466 | B2 | 11/2005 | Bolian | |
| 2002/0085870 | A1* | 7/2002 | Konishi | B41J 3/4075 400/76 |
| 2003/0160517 | A1* | 8/2003 | Lo | H01H 47/223 307/140 |
| 2007/0279678 | A1* | 12/2007 | Kobayashi | G03G 15/5016 358/1.15 |
| 2009/0183017 | A1* | 7/2009 | Chang | G06F 8/67 713/323 |

(Continued)

FOREIGN PATENT DOCUMENTS

CN           1256543 A     6/2000
CN         101930274 A    12/2010
(Continued)

*Primary Examiner* — Robert Fennema
*Assistant Examiner* — Jigneshkumar Patel
(74) *Attorney, Agent, or Firm* — Canon U.S.A., Inc. IP Division

(57) ABSTRACT

An information processing apparatus includes a switching unit configured to switch between supply and cutoff of power to the information processing apparatus, a driving unit configured to cause the switching unit to be OFF-state to cut off the supply of power to the information processing apparatus, and a control unit configured, in a case where a predetermined condition is satisfied, to drive the driving unit to cause the switching unit to be OFF-state, in which, if the supply of power to the information processing apparatus is not cut off in response to the control unit driving the driving unit, the control unit reboots the information processing apparatus.

25 Claims, 12 Drawing Sheets

(56) References Cited

U.S. PATENT DOCUMENTS

| | | | | |
|---|---|---|---|---|
| 2010/0095144 A1* | 4/2010 | Yamanaka | ............... | A63F 13/10 |
| | | | | 713/323 |
| 2010/0325462 A1* | 12/2010 | Okuzono | .................. | G06F 1/26 |
| | | | | 713/324 |
| 2012/0050812 A1* | 3/2012 | Takahashi | ................ | B41J 29/38 |
| | | | | 358/1.16 |
| 2012/0159212 A1 | 6/2012 | Takatani | | |

FOREIGN PATENT DOCUMENTS

| | | |
|---|---|---|
| CN | 102033601 A | 4/2011 |
| JP | H06-051873 A | 2/1994 |
| JP | H08-183228 A | 7/1996 |
| JP | H09-128177 A | 5/1997 |
| JP | 2002-073220 A | 3/2002 |
| JP | 2008-142942 A | 6/2008 |
| JP | 2008-182580 A | 8/2008 |
| JP | 2011-170763 A | 9/2011 |

* cited by examiner

FIG.4

| IMAGE FORMING APPARATUS 1 POWER STATE | PRINTING UNIT 12 | READING UNIT 11 | OPERATION PANEL 14 | CONTROL UNIT 10 |
|---|---|---|---|---|
| NORMAL STATE | ○ | ○ | ○ | ○ |
| POWER SAVING STATE | × | × | ○ | ○ |
| AUTOMATIC OFF STATE | × | × | × | × |

INFORMATION PROCESSING APPARATUS AND METHOD FOR CONTROLLING THE SAME

BACKGROUND OF THE INVENTION

Field of the Invention

The present invention relates to an information processing apparatus including a switching unit for switching between the supply and the cutoff of power to the information processing apparatus and a method for controlling the information processing apparatus Description of the Related Art Up until now, to realize saving power of an apparatus, there has been known an image processing apparatus such as a copying machine and a printer including an automatic-OFF drive circuit for automatically turning off a power switch if the apparatus is not used for a certain period of time.

Japanese Patent Application Laid-Open No. 2008-142942 discusses an apparatus executing automatic power-OFF function in which a power switch is equipped with a mechanical relay, and when the power switch is turned on, the relay is driven by signal control from the outside to turn off the power switch.

If the automatic power-OFF function is executed, the power switch is thrown to a OFF side by the mechanical relay to shut down the power source of an image forming apparatus from an alternating current (AC) power input unit. The control unit of the image forming apparatus returns the image forming apparatus to a normal mode even in a power saving mode, so that power is supplied to a large number of portions to operate the apparatus.

Cutting off the power from the control unit during its operation may cause problems of the apparatus such as disappearance of data and failure in driving components. In order to avoid such problems of the apparatus, the automatic power-OFF function needs to be executed after the shutdown preparation control of the control unit is executed and time elapses to such an extent that the apparatus is not affected even if the power is shut down.

If the drive of the mechanical relay using a driving signal fails for some reason, the power of the apparatus is not turned off even if the automatic power-OFF function is executed. For example, the above phenomenon is caused in a case where a user happens to exert force to a power switch when the mechanical relay is driven by a driving signal.

Thus, if the turn off of the power switch cannot be made, the power switch of the apparatus is still turned on, but the control unit already completes the shutdown preparation control, so that a freezing state where the apparatus cannot receive operation from the user is continued.

In this state, the control unit is in a shutdown ready state, so that neither the control unit can issue a notification of error nor the user can make determination, which may inhibit the apparatus from being used.

Similarly, if the driving unit of the mechanical relay, a wiring for a driving signal, and the power switch itself fail, the control unit executing the automatic power-OFF function cannot turn off the power source of the apparatus, bringing the apparatus into a freezing state.

Turning on and off the power switch in the above state sometimes can return the apparatus to a normal mode, however, if the automatic power-OFF function is executed again from the power saving mode, the apparatus is brought into the freezing state. If the apparatus is brought into the freezing state, the shutdown preparation control is completed irrespective of a state where the apparatus is supplied with power, so that the apparatus cannot receive any operation from the user, which consumes useless power.

The freezing state can be prevented from occurring again unless the automatic power-OFF function is used, however, the control unit completes the shutdown control, so that the control unit cannot execute a process where the user is notified of the failure using an error massage. For this reason, the user cannot determine the state, so that the apparatus is prevented from being used.

SUMMARY OF THE INVENTION

The present invention provides a mechanism which prevents a problem from occurring when an automatic power-OFF cannot be executed in which the power switch of the image forming apparatus is automatically turned off.

According to an aspect of the present invention, an information processing apparatus includes a switching unit configured to switch between supply and cutoff of power to the information processing apparatus, a driving unit configured to cause the switching unit to be OFF-state to cut off the supply of power to the information processing apparatus, and a control unit configured, in a case where a predetermined condition is satisfied, to drive the driving unit to cause the switching unit to be OFF-state, in which, if the supply of power to the information processing apparatus is not cut off in response to the control unit driving the driving unit, the control unit reboots the information processing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates a power state at each unit of the image forming apparatus.

DESCRIPTION OF THE EMBODIMENTS

Various exemplary embodiments, features, and aspects of the invention will be described in detail below with reference to the drawings.

Figure 1:
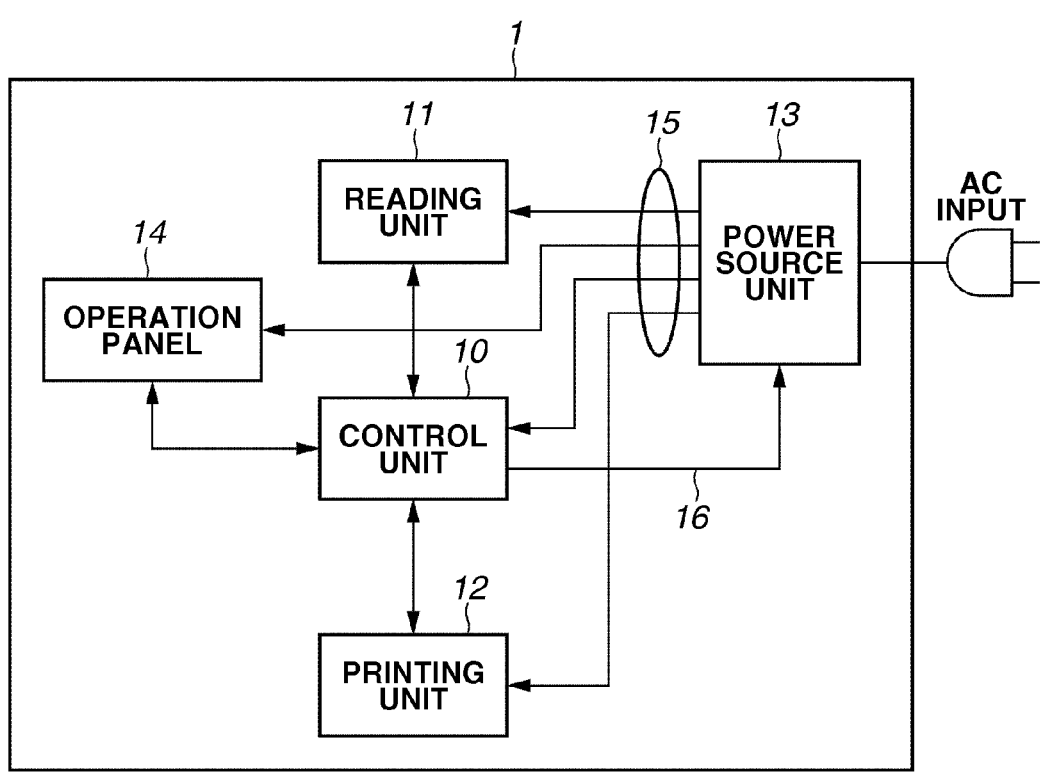
FIG. 1 is a block diagram illustrating an example of a configuration of hardware of an image forming apparatus according to a preferable exemplary embodiment of the present invention.

A first exemplary embodiment is described below. FIG. 1 is a block diagram illustrating a configuration of hardware of an image forming apparatus according to a preferable exemplary embodiment of the present invention. Each block indicates a module and arrows between the blocks indicate flows of data, instructions, and supplied power.

In FIG. 1, an image forming apparatus 1 in the present exemplary embodiment includes a printing unit 12, a reading unit 11, an operation panel 14, a power source unit 13, and a control unit 10 for controlling the units.

Figure 2:
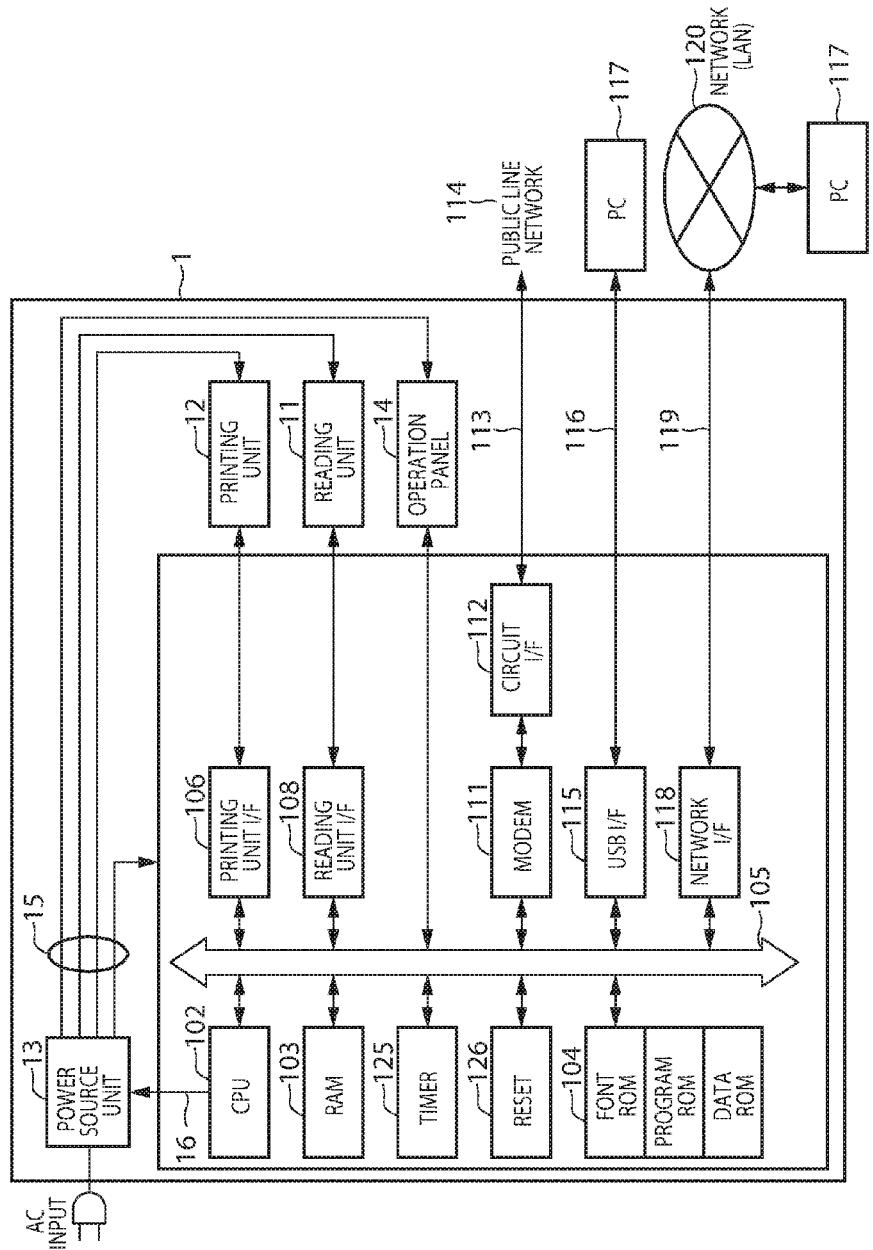
FIG. 2 is a block diagram illustrating an example of a configuration of a control unit.

The control unit 10 executes image processing based on image data received from a reading unit 11, a host computer (a personal computer (PC) 117 in FIG. 2, for example) acting as an external apparatus, and a facsimile apparatus (not illustrated) connected via a public switched telephone network (PSTN) circuit (a public line), and outputs the data to the printing unit 12 to form an image on a sheet, for example.

The reading unit 11 reads a document as image data and transmits the read image data to the control unit 10. The reading unit 11 includes a scanner unit (not illustrated) with a function to read a document and a document feeding unit (not illustrated) with a function to convey a document sheet.

The printing unit 12 conveys a recording sheet, prints the image data received from the control unit 10 as a visible image on a sheet by an electrophotographic method, and discharges the sheet outside the apparatus. The printing unit 12 includes a sheet unit (not illustrated) with a plurality of different types of recording paper cassettes, a marking unit (not illustrated) with a function to transfer and fix image data to the recording paper, and a discharge unit (not illustrated) with a function to sort and staple the printed recording paper and output the printed recording paper outside the apparatus.

The power source unit 13 is a power source circuit with an alternating current (AC) commercial power source as an input. The power source unit 13 generates a direct-current (DC) power source 15 to the control unit 10, the reading unit 11, the printing unit 12, and the operation panel 14. The power source unit 13 controls the supply and shutdown of the power source 15 according to a control signal 16 from the control unit 10.

The operation panel 14 performs various settings for causing the printing unit 12 to form images of the document read by the reading unit 11 based on operator's (user's) instructions. The operation panel 14 such as a touch panel, for example, is used to selectively input the number of copies of images to be formed, information about density in forming images, and the reading resolution of the scanner unit for reading the document (300 dpi or 600 dpi, for example).

FIG. 2 is a block diagram illustrating an example of configuration of the control unit 10. The control unit 10 includes a CPU 102, a random access memory (RAM) 103, a read only memory (ROM) 104, a printing unit interface (I/F) 106, a reading unit I/F 108, a modulator and demodulator (MODEM) 111, a line I/F 112, a Universal Serial Bus (USB) I/F 115, and a network I/F 118. The blocks are connected with each other via a system bus 105.

The CPU 102 generally controls the blocks according to various control programs. The various control programs are executed by reading the control programs stored in a program area of the ROM 104. Alternatively, the various control programs are executed by decompressing and developing compressed data stored in the program area of the ROM 104 and loading into the RAM 103. Further, the various control programs may be stored in a hard disk drive (HDD) (not illustrated) or a solid state drive (SSD) in a compressed state or a decompressed state.

The network I/F 118 communicates with the host computer 117 (expressed as PC in the figure, hereinafter referred to as PC) via a local area network (LAN) 120. The network I/F 118 is connected with the network (LAN) 120 via a communication cable such as a LAN cable 119.

The MODEM 111 is connected with a public line network 114 via a circuit I/F 112 to communicate with other image forming apparatuses, a facsimile apparatus, and a telephone (not illustrated). The circuit I/F 112 is generally connected with the public line network 114 via a telephone line 113.

The printing unit interface (I/F) 106 functions as an interface for outputting an image signal to the printing unit 12 (a printer engine). The reading unit I/F 108 functions as an interface for inputting the image signal read from the reading unit 11 (a scanner engine). The CPU 102 processes the image signal input from the reading unit I/F 108 and outputs the image signal as a recorded image signal to the printing unit I/F 106.

The CPU 102 displays a character and a mark on the display unit of the operation panel 14 using font information stored in the font area of the ROM 104 and receives information from the operation panel 14 instructed by the user.

Information about the image forming apparatus 1, telephone directory information about users, and department management information are stored in the data area of the ROM 104, read and updated according to need by the CPU 102. The data area of the ROM 104 can be rewritten by the CPU 102.

Time is set to a timer 125 by the CPU 102 to generate interruption to the CPU 102 at a desired period. A reset circuit 126 outputs a reset signal to the CPU 102. The CPU 102 continues a reset state while the power source 15 is input to the control unit 10 and a reset signal is rendered to a low level. A low output of the reset signal is set by the CPU 102. The low output of the reset signal is performed also in a case where a power switch 133 (in FIG. 3) is turned off to stop the supply of the power source 15 or the power source 15 does not reach a predetermined voltage level (a voltage of a 3.3 V power source is lower than 2.9 V, for example) due to the power failure or the instantaneous interruption of the AC power supply.

The reset state of the CPU 102 is released by switching the reset signal of the reset circuit 126 from low (L) to high (H) in a predetermined time period (100 ms, for example) after the power source 15 is input to the control unit 10.

Figure 3:
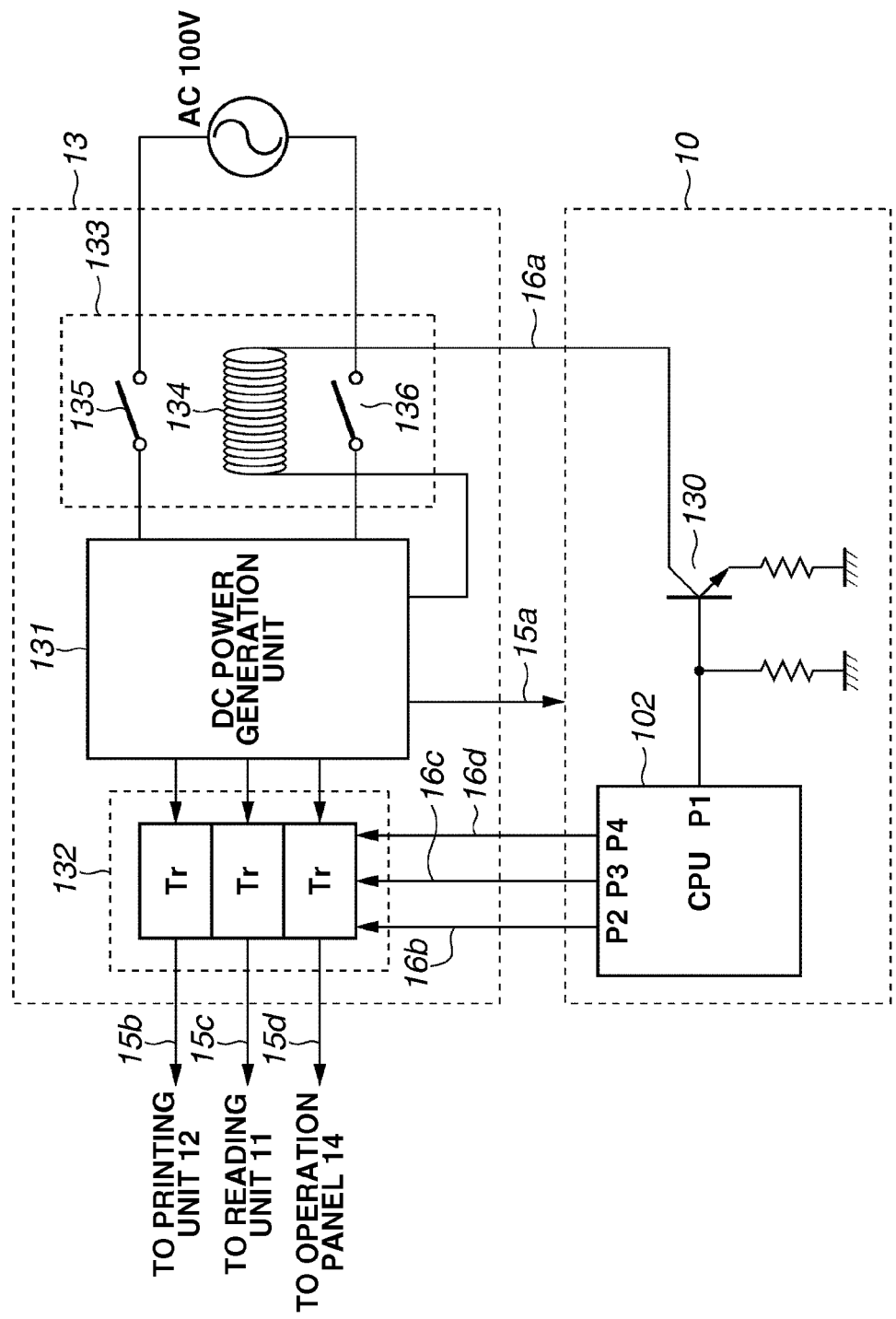
FIG. 3 is a block diagram illustrating a configuration of a power source unit and a central processing unit (CPU).

FIG. 3 is a block diagram illustrating a configuration of the power source unit 13 and the CPU 102. As illustrated in FIG. 3, the power source unit 13 includes a direct current (DC) power generation unit 131, a transistor unit 132, and a power switch 133.

The DC power generation unit 131 rectifies power supplied from a commercial power supply (AC 100 V), transforms, and supplies the power to each unit of the image forming apparatus 1 as DC power sources 15a, 15b, 15c, and 15d. The transistor unit 132 is formed of field effect transistors (FET) and the DC power sources 15b, 15c, and 15d supplied to the printing unit 12, the reading unit 11, and the operation panel 14 are turned on and off by the control signals 16b, 16c, and 16d of the CPU 102. The control signals 16b, 16c, and 16d are connected with the output ports P2, P3, and P4 of the CPU 102 respectively.

The power switch 133 is provided with a solenoid 134 therein. The solenoid 134 is energized to open the contacts of switches 135 and 136, turning off the power switch 133. In the present exemplary embodiment, the power switch 133 uses a rocker switch (a see-saw switch), for example, illustrated in FIG. 7, which is provided with a toggle mechanical relay that drives the rocker switch to an OFF-position by energizing the solenoid 134 inside the power switch 133.

Figure 7:
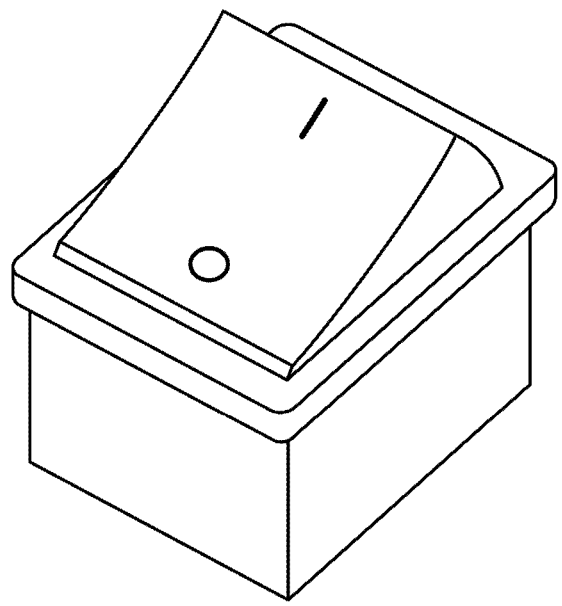
FIG. 7 illustrates an example of the appearance of a rocker switch.

FIG. 7 illustrated an example of appearance of the rocker switch.

The control unit 10 can be operated by receiving power of the DC power source 15a of the DC power generation unit 131 by the user manually switching the power switch 133 to ON. If the image forming apparatus 1 satisfies a condition for exerting an automatic power-OFF function, the control unit 10 supplies power to the solenoid 134 by the control signal 16a of the power switch 133 to switch the switches 135 and 136 to OFF, stopping supplying power to each unit (OFF driving of the power switch).

The control signal 16a of the power switch 133 is connected with an output port P1 of the CPU 102 via a transistor 130. If a high signal, for example, is output from the output port P1 of the CPU 102, the transistor 130 is turned on to cause current to flow to the solenoid 134. More specifically, at this point, the current flows to a circuit formed of the DC power generation unit 131, the solenoid 134, the transistor 130, and the ground (GND) in this order to energize the solenoid 134.

The configuration of the power switch 133 is not limited to the configuration illustrated in FIG. 3. Any configuration may be used provided that the power switch 133 can be manually switched to ON by the user and a switch can be switched to OFF by a signal from the CPU 102.

FIG. 4 illustrates a power state at each unit (the printing unit 12, the reading unit 11, the operation panel 14, the control unit 10) of the image forming apparatus 1. Symbols (circle and x) in the figure represent the state of supply of power from the power source unit 13 to each unit. The state where the power source 15 is supplied from the power generation unit 131 to each unit is represented by the circle. The state where the power source 15 is stopped is represented by "x."

The power source is supplied to each unit by the above described control of the output ports P1 to P4 of the CPU 102.

The term "normal state" in FIG. 4 refers to one of the power state shifted after the user turns on the power switch 133. In the normal state, the DC power generation unit 131 supplies power to the printing unit 12, the reading unit 11, and the operation panel 14, as well as the control unit 10 and the user can operate the entire image forming apparatus 1.

The term "power saving state" in FIG. 4 refers to one of the power state shifted if a case where the user does not perform any operation is continued during a predetermined shifting period of the power saving state (Ts1) in the normal state. The shifting period of the power saving state (Ts1) is a time period which is preset by the user operating a key (not illustrated) on the operation panel 14 and stored in the data area of the ROM 104. A set shifting period (Ts1) can be read by the CPU 102 from the ROM 104.

In the power saving state, the DC power generation unit 131 supplies power to the control unit 10 and the operation panel 14 but stops supplying power to the printing unit 12 and the reading unit 11. In the power saving state, the control unit 10 switches the output ports P2 and P3 to cause the DC power generation unit 131 to stop supplying the power sources 15b and 15c.

In the power saving state, if the user performs the following operations (1) to (4), for example, the CPU 102 recognizes the operation to switch the output ports P2 and P3, supplying the power sources 15b and 15c (in other words, supplying power to the printing unit 12 and the reading unit 11), thereby the power saving state is returned to the normal state.

(1) Pressing the operation key of the operation panel 14
(2) Inputting a job from the network I/F 118 (input of a returning trigger)
(3) Inputting a job from the USB I/F 115 (input of the returning trigger)
(4) Inputting a job from the MODEM I/F 111 (input of the returning trigger)

In FIG. 4, the term "automatic-OFF state" refers to one of the power state shifted by the control unit 10 executing an automatic-OFF drive of the power switch 133 if a case where the user does not perform any operation is continued during a predetermined shifting period of the automatic-OFF state (Tsh) in the power saving state.

In the automatic-OFF state, a normal drive of the power switch 133 turns off the switches 135 and 136 to stop the entire power source 15 supplied from the power source 13 to each unit. The shifting period of the automatic-OFF state (Tsh) is a time period which is preset by the user operating a key (not illustrated) on the operation panel 14 and stored in the data area of the ROM 104. A set shifting period (Tsh) can be read by the CPU 102 from the ROM 104.

If a case where the user does not perform any operation is continued during the Tsh period from the power saving state, the control unit 10 executes a "shutdown preparation control" described below. In the shutdown preparation control, the control unit 10 switches the output port P4 to stop supplying power to the operation panel 14 by the control of the transistor unit 132 and supplies power only to the control unit 10 from the DC power generation unit 131.

The control unit 10 stops the communication process of the line I/F 112, the USB I/F 115, and the network I/F 118 to cause the CPU 102 to stop recognizing the operation functioning in the power saving state.

The control unit 10 transfers data requiring backup even after power off such as the reception data of the MODEM 111 and data set by the operation panel 14 among the data stored in the RAM 103 to the data area of the ROM 104 and stored therein.

If a storage device in which an ending sequence for turning off the power is prescribed, such as a HDD, is used as an auxiliary storage device in the control unit 10, the control unit 10 subjects the auxiliary storage device to the prescribed power off control.

When the shutdown preparation control is completed, the control unit 10 executes an off-drive of the power switch 133. More specifically, the control unit 10 supplies power to the solenoid 134 to switch the switches 135 and 136 to OFF, stopping supplying power to each unit. In the power-off drive (or automatic-OFF drive) of the power switch 133, the output port P1 of the CPU 102 is controlled to supply power to the solenoid 134, turning off the switches 135 and 136.

If pressure is applied to the on-side of the power switch 133 (the rocker switch) for some reason, the power switch 133 may not be thrown to the off-position by the driving force of the solenoid 134 even if the solenoid 134 is energized. For example, if the user operates the power switch 133 to exert pressure on the on-position while the automatic-off control is being executed, the power switch 133 may not be thrown to the off-position by the driving force of the solenoid 134. Furthermore, even if the power switch 133 is thrown to the off-position by energizing the solenoid 134, if the user throws the power switch 133 to the on-position again before the output voltage of the DC power generation unit 131 lowers, the power switch 133 may not be thrown to the off-position. Still furthermore, if the power switch 133 contacts other objects with pressure applied thereto, the power switch 133 may not be thrown to the off-position.

In such a case, even if the power-off drive of the power switch 133 is executed, the power switch 133 is actually not turned off, however, the CPU 102 is in a state where the automatic-OFF drive of the power switch 133 is completed, so that the image forming apparatus 1 continues the shutdown preparation control.

A first exemplary embodiment is configured such that, if the power supplied to the control unit 10 is not turned off a predetermined time period after the control unit 10 performs the automatic-OFF drive, the control unit 10 reboots the image forming apparatus 1. The reboot of the image forming apparatus 1 is executed by outputting a reset signal set to the reset circuit 126 by the control unit 10.

The operation of the power switch automatic-OFF control according to the first exemplary embodiment is described below with reference to FIG. 5.

Figure 5:
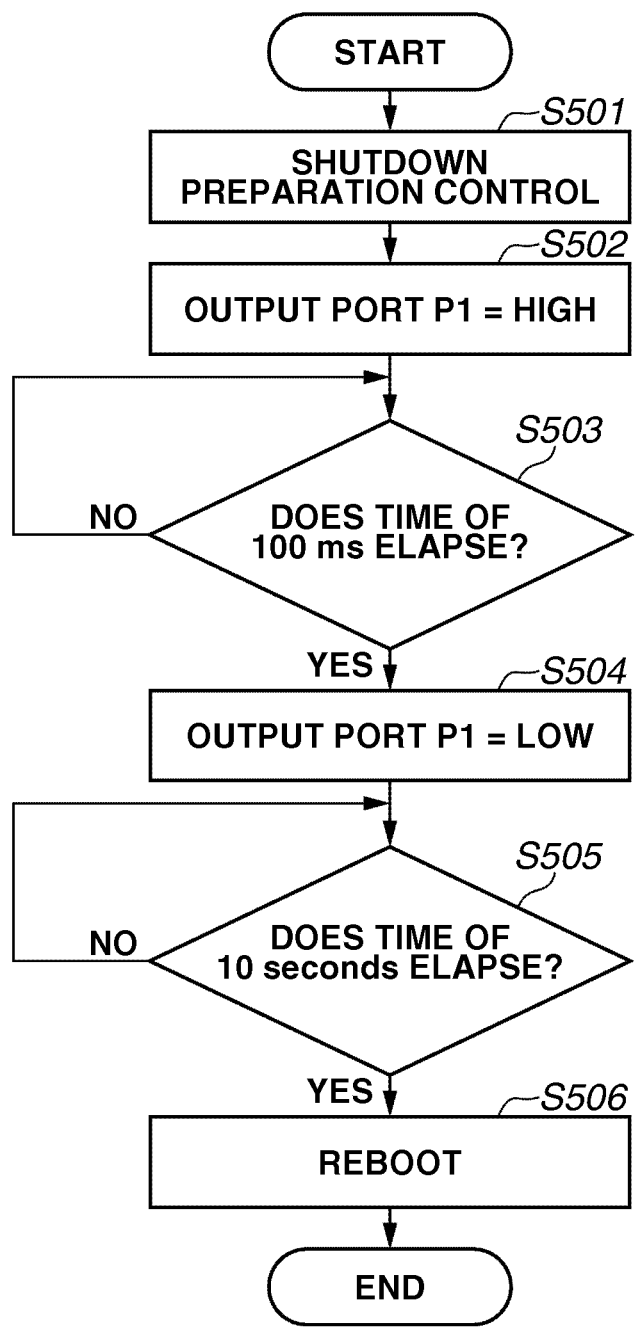
FIG. 5 is a flow chart illustrating an example of a power switch automatic-OFF drive control according to a first exemplary embodiment.

FIG. 5 is a flow chart illustrating an example of the power switch automatic-OFF control according to the first exemplary embodiment. The processes illustrated in the flow chart of FIG. 5 are realized by the CPU 102 executing the program computer-readably stored in the ROM 104 (or loaded to the RAM 103 from the ROM 104).

A case where the user does not perform any operation is continued during the time Tsh after the power state of the image forming apparatus 1 is shifted to the power saving state, thereafter the CPU 102 performs the shutdown preparation control of the control unit 10 to turn off the power switch 133. If the switches 135 and 136 are not turned off by the automatic-OFF drive (i.e., if the supply of power to the image forming apparatus 1 is not cut off), the CPU 102 reboots the image forming apparatus 1. The flow chart will be described in detail below.

In step S501, the CPU 102 executes the shutdown preparation control and the CPU 102 proceeds to step S502. In the shutdown preparation control, the CPU 102 switches the output port P4 to stop supplying power to the operation panel 14 by the control of the transistor unit 132. The CPU 102 stops communication process of the line I/F 112, the USB I/F 115, and the network I/F 118 in the control unit 10 to stop the job detection function functioning in the power saving state. Furthermore, the CPU 102 transfers data requiring backup even after power off such as the reception data of the MODEM 111 and data set by the operation panel 14 among the data stored in the RAM 103 to the ROM 104 and stored therein. If a storage device such as a HDD in which an ending sequence at the time of turning off power is prescribed is used as an auxiliary storage device in the control unit 10, the CPU 102 executes a prescribed power-off control on the auxiliary storage device. In other words, if a predetermined condition is satisfied in which a state where operation is not performed after the image forming apparatus 1 shifts to the power saving state continues for a predetermined time period, the CPU 102 executes a preparation process for stopping a predetermined function of the image forming apparatus 1 and then executes the power-off drive of the power switch 133.

In step S502, the CPU 102 switches the output port P1 to a high level and supplies power to the solenoid 134 to execute the power-off drive of the power switch 133. In step S503, the CPU 102 monitors the elapse of time of 100 ms using the timer 125.

If the CPU 102 detects that a time of 100 ms elapses from the interrupt notification of the timer 125 (YES in step S503), in step S504, the CPU 102 switches the output port P1 to a low level to stop supplying power to the solenoid 134. A time of 100 ms depends on the specifications of the solenoid 134 used. The time of 100 ms shown in the present exemplary embodiment is merely an example. A time for which the solenoid is energized may be a time for which the power switch 133 can be driven to OFF side and which does not affect the lifetime of the image forming apparatus 1 (the driving unit of the power switch 133, for example).

In step S505, the CPU 102 monitors the elapse of time of 10 seconds using the timer 125. A time of 10 seconds is merely an example. The time may be a time that can ensure until the power switch 133 is driven to OFF after the CPU 102 switches the output port P1 to a low level to stop supplying power to the solenoid 134.

If the power-off drive of the power switch 133 normally functions, the switches 135 and 136 are turned off before a time of 10 seconds elapses (during NO in step S505), to turned off the power source 15 of the control unit 10, ending the control of the CPU 102. Therefore, the processes subsequent to the affirmative decision (YES) in step S505 are executed only in a case where the power supply 15 is continuously supplied to the control unit 10 even after a time of 10 seconds elapses.

If the CPU 102 detects that a time of 10 seconds elapses from the interrupt notification of the timer 125 (YES in step S505), the CPU 102 determines that the power switch 133 is not OFF-state for some reason. The CPU 102 proceeds to step S506.

In step S506, the CPU 102 performs setting to the reset circuit 126 to output the reset signal to the control circuit 10, thereby controlling execute for rebooting the image forming apparatus 1. As described above, the power-off drive of the power switch 133 provided with the mechanical relay is executed after the completion of the shutdown preparation control of the control circuit 10 of the image forming apparatus 1. If the supply of power source is not cut off even after the predetermined time period elapses after the power-off drive of the power switch 133 is started, the CPU 102 reboots the image forming apparatus 1. Such a configuration can avoid a "freezing state" in which the image forming apparatus 1 does not receive any operation, even in a case where the power switch 133 is not thrown to the off-position because some external force is applied to the on-side of the power switch 133.

The reboot of the image forming apparatus 1 is executed by outputting the reset signal by the control circuit 10 performing setting to the reset circuit 126. Alternatively, the reboot may be executed by a watchdog timer (not illustrated). The watchdog timer monitors the operation state of the CPU 102. If the CPU 102 cannot continue a normal operation, the reset signal is output to the control circuit 10 after the predetermined time started by the timer elapses.

A second exemplary embodiment will be described below.

In the first exemplary embodiment, the flow chart illustrated in FIG. 5 is described in which the image forming apparatus 1 is rebooted 10 seconds after the execution of the power-off drive of the power switch. However, although it is originally configured such that the power source of the image forming apparatus 1 is automatically turned off after a state where the user does not perform any operation is continued, consumption power is returned again to a high state due to reboot. In a second exemplary embodiment, a configuration for surely executing the automatic-OFF drive without uselessly rebooting the image forming apparatus 1 will be described.

Figure 6:
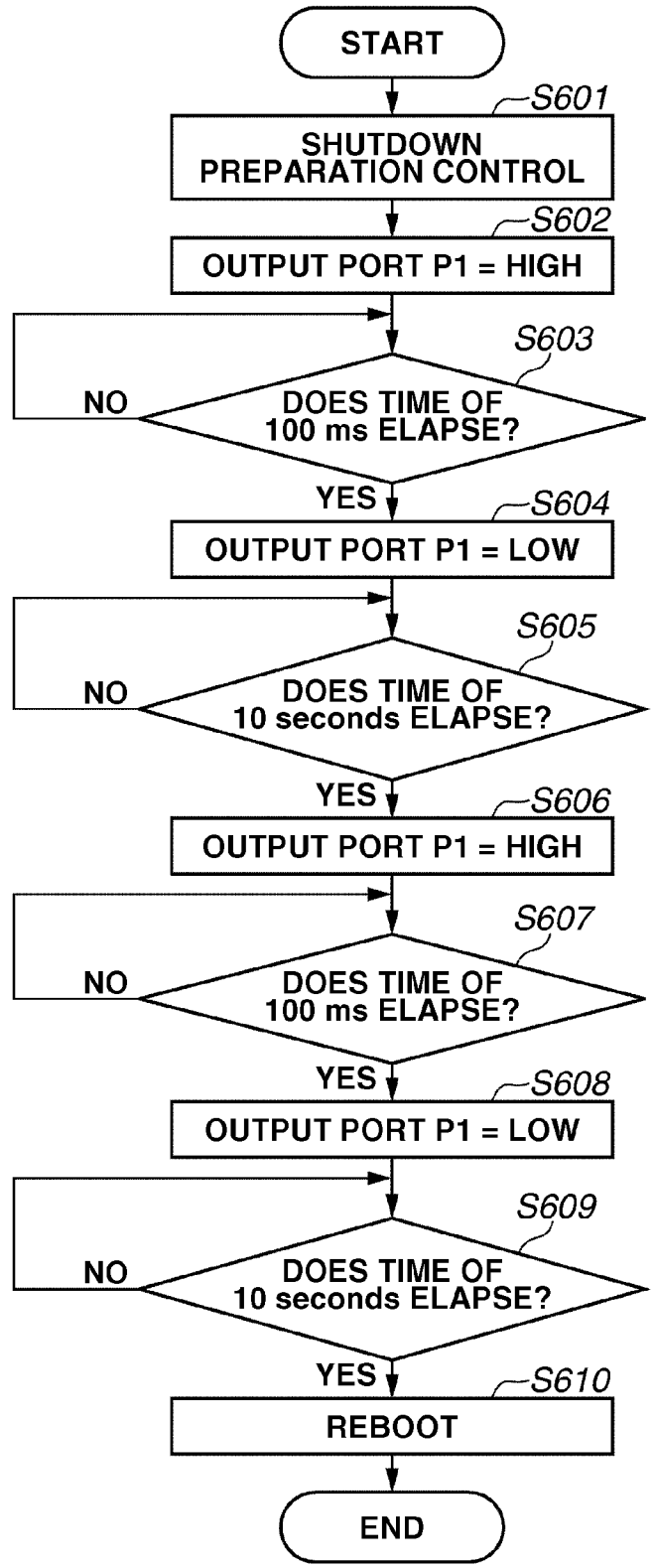
FIG. 6 is a flow chart illustrating an example of a power switch automatic-OFF drive control according to a second exemplary embodiment.

An operation of a power switch automatic-OFF control in the second exemplary embodiment is described with reference to FIG. 6. FIG. 6 is a flow chart illustrating an example of the power switch automatic-OFF control in the second exemplary embodiment. The processes illustrated in the flow chart of FIG. 6 are realized by the CPU 102 executing the program computer-readably stored in the ROM 104 (or loaded to the RAM 103 from the ROM 104).

The processes of steps S601 to S605 are the same as those of steps S501 to S505 in FIG. 5, so that description thereof is omitted. In step S605, if the power source of the image forming apparatus 1 is not turned off even after 10 seconds, in step S606, the CPU 102 switches the output port P1 to a high level and supplies again power to the solenoid 134 to execute again the power-off drive of the power switch 133. The processes of steps S606 to S609 are the same as those of steps S602 to S605 (i.e., the same as those of steps S502 to S505 in FIG. 5), so that description thereof is omitted.

In step S609, if the power source of the image forming apparatus 1 is not turned off even after 10 seconds, in step S610, the CPU 102 performs setting to the reset circuit 126 to output the reset signal to the control circuit 10, thereby rebooting the image forming apparatus 1.

Even if the user applies by accident an external force to the power switch 133 at the time of first energizing the solenoid 134 in step S602, for example, the external force may probably be released at the time of second energizing the solenoid 134 by the abovementioned process. Thereby, even if the power-off drive cannot be performed by accident due to the application of an external force to the power switch 133, the freezing state of the apparatus can be avoided with a useless reboot avoided.

A third exemplary embodiment will be described below. There is a case where the power source cannot be turned off and brought into the freeze state by the power switch-off drive, excluding a case where some external force is applied to the on-side of the power switch 133 as described in the first and second exemplary embodiments.

If the switches 135 and 136 are not turned off in spite of the control circuit 10 executing the power-off drive of the power switch due to a failure in the power switch 133, for example, the CPU 102 is brought into a state where the off-drive of the power switch 133 is completed, so that the image forming apparatus 1 continues the shutdown control. For this reason, similarly to the cases described in the first and second exemplary embodiments, the power switch 133 is turned on, however, the control circuit 10 is brought into the freezing state in which the control circuit 10 cannot accept any control from the outside.

In the third exemplary embodiment, after the control circuit 10 performs the power switch-off drive in order to avoid such a freezing state, if the power source to the control circuit 10 is not turned off even if the predetermined time period elapses, the image forming apparatus 1 is rebooted to execute an initialization control.

The reboot of the image forming apparatus 1 is executed by outputting the reset signal by the control circuit 10 performing setting to the reset circuit 126. Alternatively, the reboot may be executed by a watchdog timer (not illustrated). The watchdog timer monitors the operation state of the CPU 102. If the CPU 102 cannot continue a normal operation, the reset signal is output to the control circuit 10 after the predetermined time started by the timer elapses.

Figure 8:
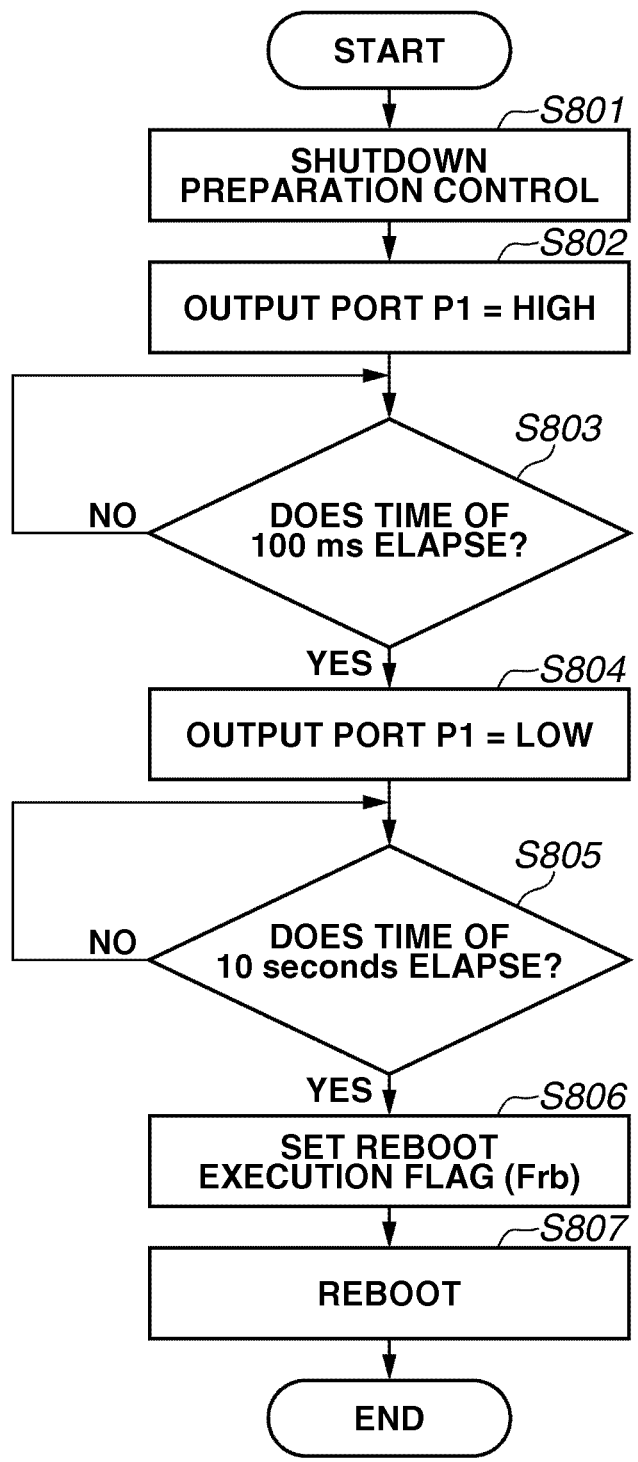
FIG. 8 is a flow chart illustrating an example of a power switch automatic-OFF drive control according to a third exemplary embodiment.

The operation of the power switch automatic-OFF control according to the third exemplary embodiment is described below with reference to FIG. 8. FIG. 8 is a flowchart illustrating an example of the power switch automatic-OFF control according to the third exemplary embodiment. The processes illustrated in the flow chart of FIG. 8 are realized by the CPU 102 executing the program computer-readably stored in the ROM 104 (or loaded to the RAM 103 from the ROM 104).

A case where the user does not perform any operation is continued for the time Tsh after the power state of the image forming apparatus 1 is shifted to the power saving state, thereafter the CPU 102 performs the shutdown preparation control of the control unit 10 to turn off the power switch 133. If the switches 135 and 136 are not turned off by the power switch off drive, the CPU 102 sets a reboot execution flag to reboot the image forming apparatus 1. The flow chart is described in detail below.

The processes of steps S801 to S805 are the same as those of steps S501 to S505 in FIG. 5, so that description thereof is omitted. If the power-off drive of the power switch 133 normally functions, the switches 135 and 136 are turned off before a time of 10 seconds elapses (during NO in step S805), to cut off the power source 15 of the control unit 10, ending the control of the CPU 102. Therefore, the processes subsequent to the affirmative decision (YES) in step S805 are executed only in a case where the power supply 15 is continuously supplied to the control unit 10 even after a time of 10 seconds elapses.

If the CPU 102 detects that a time of 10 seconds elapses from the interrupt notification of the timer 125 (YES in step S805), the CPU 102 determines that the power switch 133 is not OFF-state for some reason in the power switch. The CPU 102 proceeds to step S806.

In step S806, the CPU 102 sets a reboot execution flag (Frb) as Frb=1 and stores the flag in the data area of the ROM 104. In step S807, the CPU 102 performs setting to the reset circuit 126 to output the reset signal to the control circuit 10, thereby rebooting the image forming apparatus 1.

If the image forming apparatus 1 is rebooted to release the reset, the CPU 102 executes an initialization operation (FIG. 9) of the control unit 10. Description is made with reference to FIG. 9, of a case where the user manually turns on the power switch 133 and of the initialization operation of the control circuit 10 executed after the reboot is executed in step S807 in FIG. 8 and after the image forming apparatus 1 is normally started.

Figure 9:
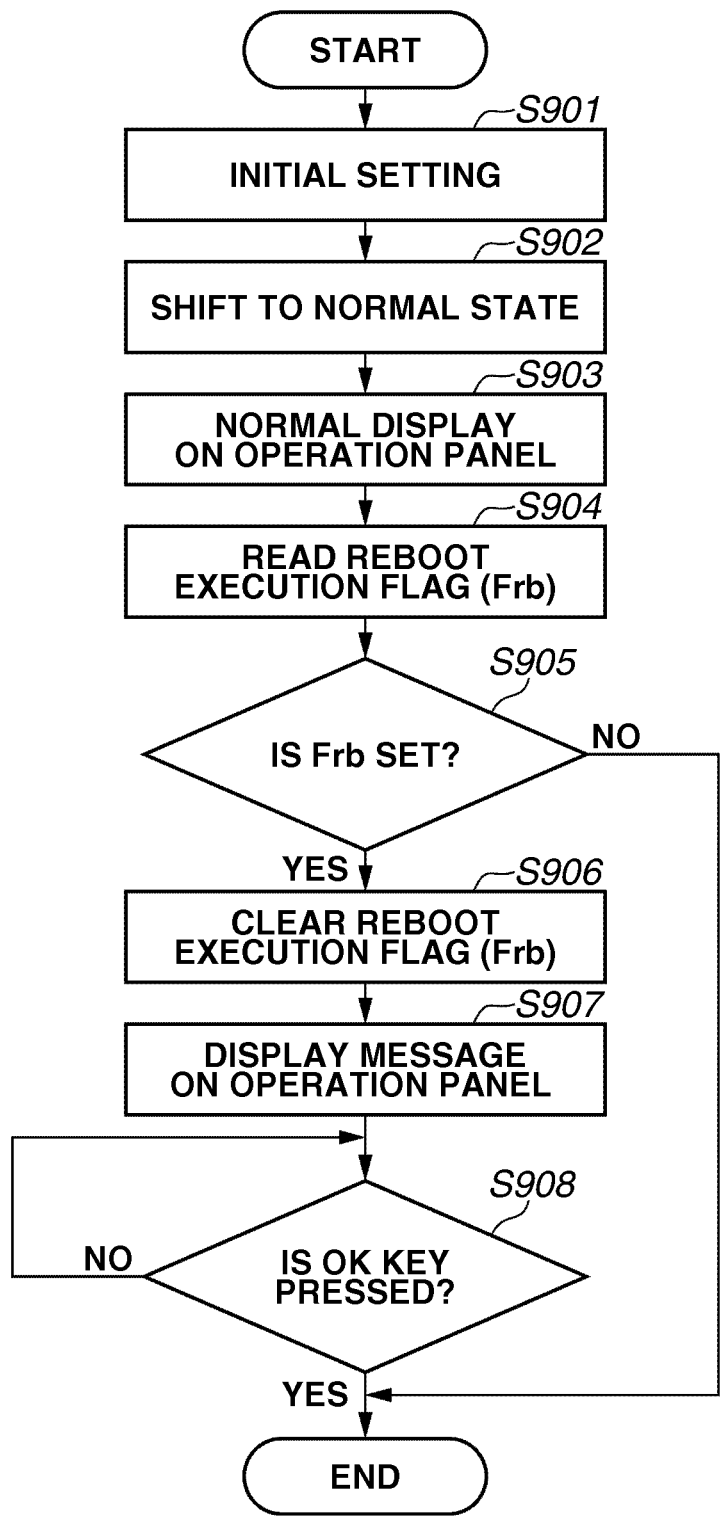
FIG. 9 is a flow chart illustrating an example of the initialization operation of the control unit according to the third exemplary embodiment.

FIG. 9 is a flow chart illustrating an example of the initialization operation of the control circuit 1 according to the third exemplary embodiment. The processes illustrated in the flow chart of FIG. 9 are realized by the CPU 102 executing the program computer-readably stored in the ROM 104 (or loaded to the RAM 103 from the ROM 104).

In step S901, the CPU 102 performs the initial setting of the control circuit 10. In step S902, the CPU 102 switches the output ports P2, P3, and P4 to cause the DC power generation unit 131 to supply the DC power sources 15b, 15c, and 15d, shifting the image forming apparatus 1 to the normal state.

In step S903, the CPU 102 displays an operation screen at the time of starting the power source on a display unit (not illustrated) of the operation panel 14. In step S904, the CPU 102 reads a reboot execution flag (Frb) from the ROM 104. The reboot execution flag (Frb) is the one that the CPU 102 stores in the data area of the ROM 104 in step S806 in FIG. 8 and that is to recognize the execution of the previous reboot. The CPU 102 can determine whether the power source is started this time by the execution of the reboot or by the user's manual operation depending on whether the setting value of the reboot execution flag (Frb) is set to "1" or "0."

In step S905, the CPU 102 determines whether the reboot execution flag (Frb) is set. If "Frb=0", the CPU 102 determines that Frb is not set. If "Frb=1", the CPU 102 determines that Frb is set.

If the CPU 102 determines that Frb is not set (NO in step S905), the CPU 102 finishes the initialization operation.

If the CPU 102 determines that Frb is set (YES in step S905), the CPU 102 proceeds to step S906.

In step S906, the CPU 102 clears (Frb=0) the reboot execution flag (Frb) stored in the data area of the ROM 104. In step S907, the CPU 102 displays message, for example, illustrated in FIG. 10 on the display unit (not illustrated) of the operation panel 14.

Figure 10:
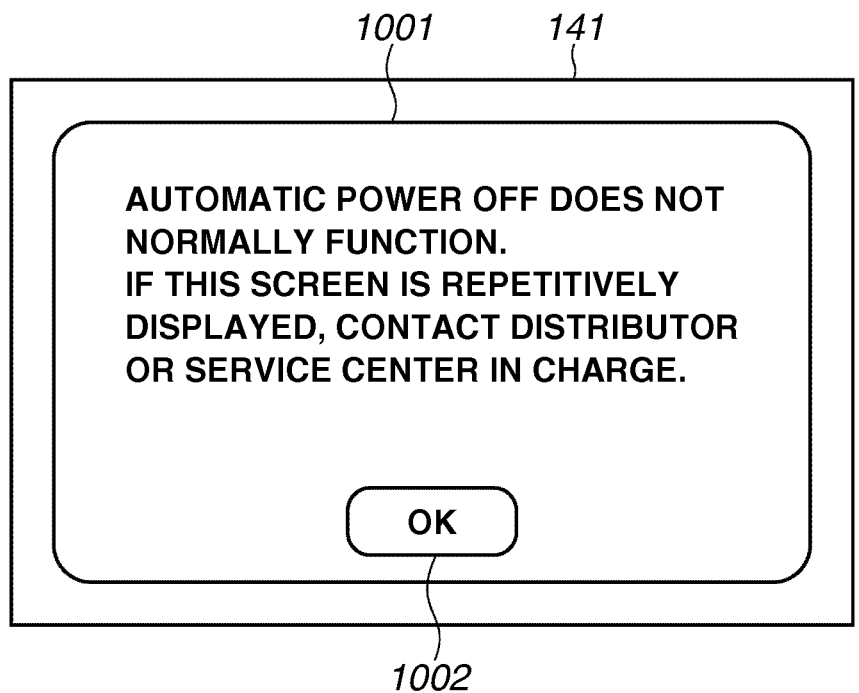
FIG. 10 is an example of a screen for warning and notifying the user that the automatic power-OFF does not normally function in the third exemplary embodiment.

FIG. 10 is an example of a screen for warning and notifying the user that the automatic power-off does not normally function in the third exemplary embodiment.

In FIG. 10, the operation panel 14 includes a display unit 141. In step S907 in FIG. 9, the CPU 102 displays a message 1001 on the display unit 141 of the operation panel 14. A message notifies the user that automatic power-off cannot normally function and the power switch 133 may fail if reboot is repeated a plurality of numbers of times. Other messages may be used provided that the user is notified of the above message.

FIG. 10 indicates an example in which the user is notified that, if the screen is repetitively displayed, a distributor or a service center needs to be contacted to request the repair or the replacement of the power switch 133. A message display 1001 may include a telephone number and a mail address useful in requesting repair.

An OK button 1002 is also displayed on the display unit 141. The user presses an OK key (not illustrated) of the operation panel 14 to allow the display unit 141 to switch the screen from the message display 1001 to the operation screen in normally starting the power source.

If a failure in the power switch 133 does not allow the automatic-OFF drive of the power switch 133, the image forming apparatus 1 is rebooted even if the automatic-OFF drive is executed again, and the screen in FIG. 10 is displayed again. The screen in FIG. 10 is repetitively displayed, so that the user or a serviceman in a dealer or a service center can determine that the power switch 133 fails.

Now, we return to the flow chart in FIG. 9. The CPU 102 continues displaying the message in step S907 until the user presses the OK key (not illustrated) of the operation panel 14 (NO in step S908). If the user presses the OK key (YES in step S908), the CPU 102 switches the display to the operation screen displayed at the time of normally starting the power source and the CPU ends the process of the flow chart.

In the present exemplary embodiment, the two of the normal and power-saving states are used as the power state excluding the automatic-OFF state of the image forming apparatus 1, however, the shutdown control of the control circuit 10 has only to be completed at the time of the automatic-OFF drive, so that the number of power states is not limited.

In the flow chart of FIG. 9, a determination is made as to whether the reboot execution flag (Frb) is set after a state is shifted to the normal state. However, the determination can be made when the CPU 102 can determine whether the reboot execution flag (Frb) is set before a state is shifted to the normal state with the power source 15 applied to the control circuit 10.

If it is confirmed that the flag (Frb) is set, the message on the operation panel 14 in step S907 may be displayed without shifting to the normal state, and then the state may be shifted to the normal state after the OK key is pressed in step S908.

As described above, the automatic-OFF drive performed by the power switch 133 with the mechanical relay is executed after the completion of the shutdown preparation control of the control circuit 10 of the image forming apparatus 1. If the supply of power source is not cut off, even if a predetermined time period elapses after the power switch off drive is executed, the control circuit 10 performs control to reboot the image forming apparatus 1. In the initialization operation after reboot, if the control circuit 10 detects the execution of reboot, the control circuit 10 notifies the screen of the operation unit that the power switch may fail. Such a configuration can inhibit the freeze state that the image forming apparatus does not receive any operation because the power switch-off drive is not performed due to failure in the power switch even if the power switch is turned on and can notify the user that the power switch may fail.

A fourth exemplary embodiment will be described below. The third exemplary embodiment describes a configuration of the initialization operation illustrated in FIG. 9 in which a determination is made as to whether the reboot execution flag (Frb) is set and, if the reboot execution flag (Frb) is set, the message illustrated in FIG. 10 is displayed. Such a configuration enables the user to recognize failure because the massage in FIG. 10 is repetitively displayed after reboot, if the power switch 133 fails not to allow the power switch 133 to be turned off.

In the fourth exemplary embodiment, if the reboot is repeated a predetermined number of times because of incapability of the automatic-OFF drive, the CPU 102 determines that the power switch 133 fails and precludes the automatic-OFF drive from being executed afterward to prevent the reboot from being repeated.

Figure 11:
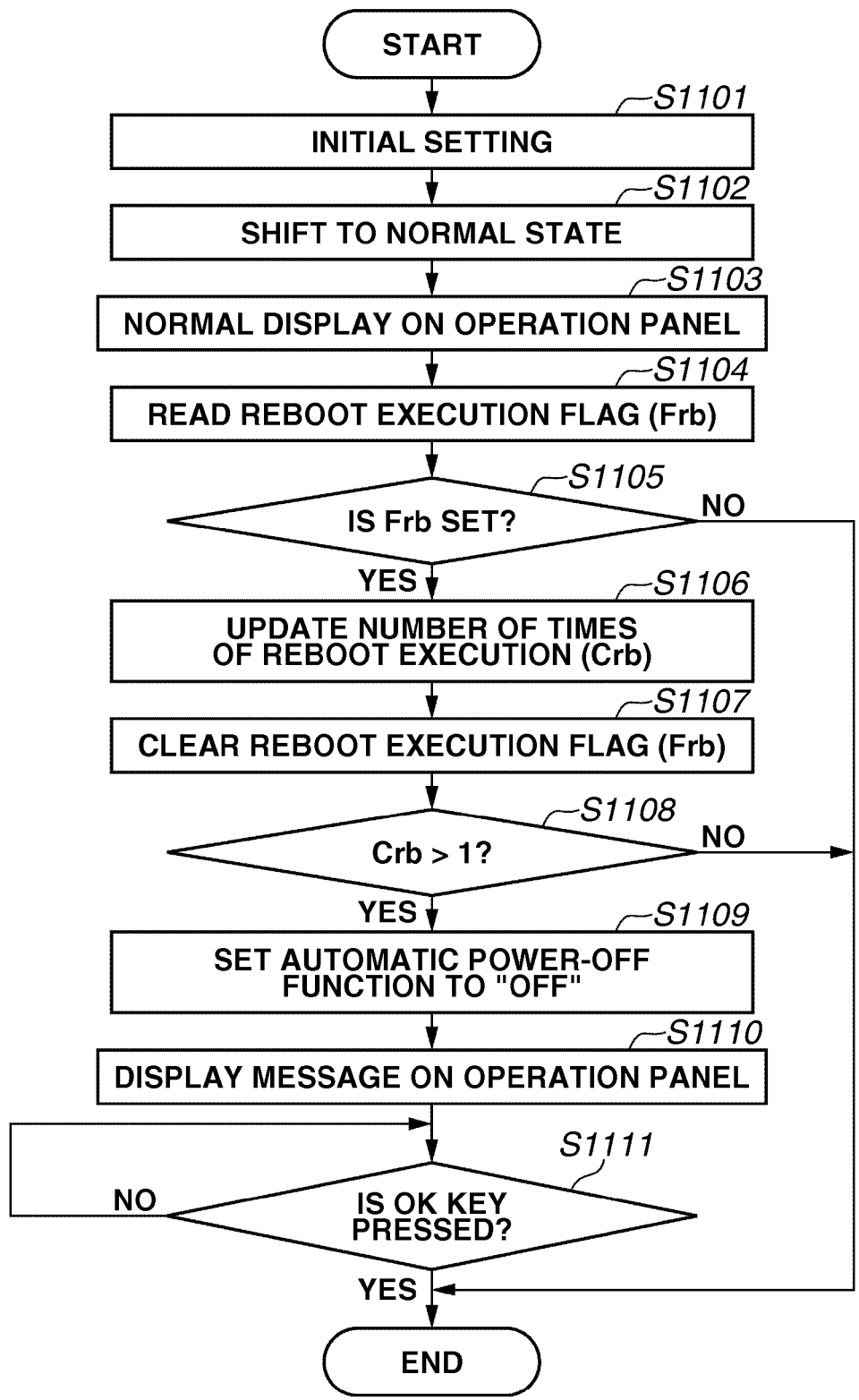
FIG. 11 is a flow chart illustrating an example of initialization operation of the control unit in a fourth exemplary embodiment.

The initialization operation of the control circuit 10 in the fourth exemplary embodiment 10 is described below with reference to FIG. 11. FIG. 11 is a flow chart illustrating an example of initialization operation of the control circuit 10 in the fourth exemplary embodiment. The processes illustrated in the flow chart of FIG. 11 are realized by the CPU 102 executing the program computer-readably stored in the ROM 104 (or loaded to the RAM 103 from the ROM 104).

The processes of steps S1101 to S1105 are the same as those of steps S901 to S905 in FIG. 9, so that description thereof is omitted. If the CPU 102 determines that the flag (Frb) is set (YES in step S1105), in step S1106, the CPU 102 counts (updates) the number of times of executing the reboot (Crb). In counting the Crb, every time the CPU 102 determines that the flag (Frb) is set in step S1105, the CPU 102 increments one count and stores the count in the data area of the ROM 104.

In step S1107, the CPU 102 clears (Frb=0) the reboot execution flag (Frb) stored in the data area of the ROM 104. In step S1108, the CPU 102 determines the number of times of executing the reboot (Crb). If the CPU 102 determines that the number of times of executing the reboot (Crb) is one (NO in step S1108), the CPU 102 completes the initialization operation. In this case, the CPU 102 may display the message illustrated in FIG. 10 described in step S907 in FIG. 9.

If the CPU 102 determines that the number of times of executing the reboot (Crb) is two or more (YES in step S1108), the CPU 102 proceeds to step S1109. In step S1109, the CPU 102 switches the setting of the automatic power-off function of the image forming apparatus 1 to an OFF position (normally, an ON position means the execution of the power switch automatic-OFF control). In other words, the CPU 102 switches the setting not to execute the automatic power-off function (or, to nullify the automatic power-off function). The setting of the automatic power-off function is stored in the data area of the ROM 104. The CPU 102 reads the setting of the automatic power-off function from the ROM 104 and executes the power switch automatic-OFF control in FIG. 8, if the automatic power-off function is set to OFF.

Figure 12:
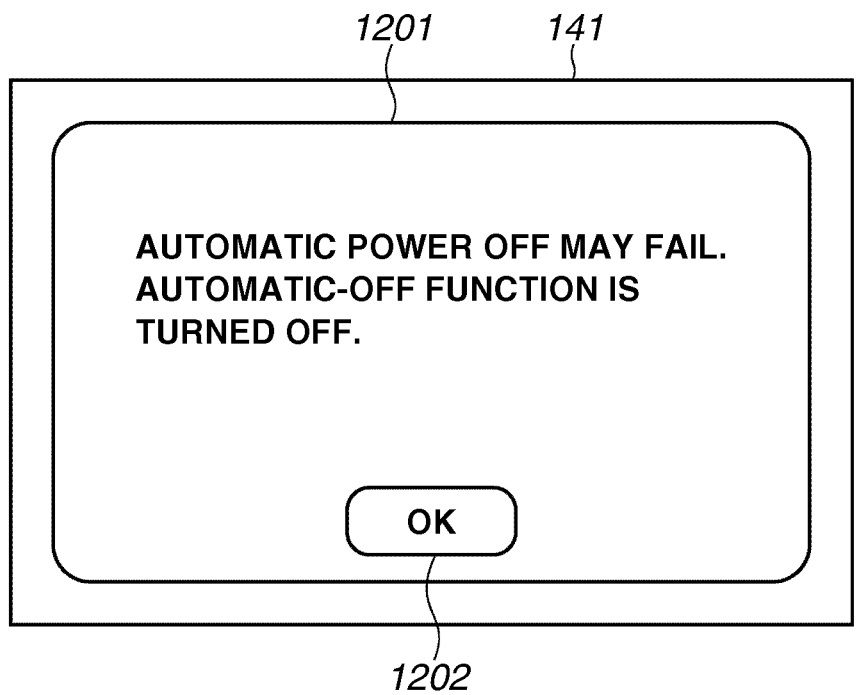
FIG. 12 is an example of a screen for warning and notifying the user that the automatic power-OFF does not normally function due to failure in the fourth exemplary embodiment.

In step S1110, the CPU 102 displays message, for example, illustrated in FIG. 12 on the display unit 141 of the operation panel 14. FIG. 12 is an example of a screen for warning and notifying the user that the automatic power-off does not normally function due to failure in the fourth exemplary embodiment. A message notifies the user that the automatic power-off cannot normally function (the power-off drive of the power switch 133) because the power switch 133 fails and the setting of the automatic power-off function of the image forming apparatus is forcibly switched to OFF. Other messages may be used provided that the user is notified of the above message.

An OK button 1202 is also displayed on the display unit 141. The user presses an OK key (not illustrated) of the operation panel 14 to allow the display unit 141 to switch the screen from a message display 1201 to the operation screen displayed at the time of normally starting the power source. The message display 1201 may include a telephone number and a mail address useful in requesting repair.

Now, we return to the flow chart in FIG. 11. The CPU 102 continues displaying the message in step S1110 until the user presses the OK key (not illustrated) of the operation panel 14 (NO in step S1111). If the user presses the OK key (YES in step S1111), the CPU 102 switches the display to the operation screen displayed at the time of normally starting the power source and the process of the flow chart is ended.

In the present exemplary embodiment, the CPU 102 determines that the power switch 133 fails if the reboot is repeated twice or more in step S1108. The power switch 133 has only to be prevented from being unable to be turned off due to reasons other than failure, for example, when the user happens to operate the power switch 133 at the power-off drive and the above determination does not depend on the number of times of repetition of the reboot. The number of times of repetition of the reboot as a criterion of failure may be previously set by the user by operating a key (not illustrated) on the operation panel 14 and store the number of times thereof in the data area of the ROM 104. In this case, in step S1108 in FIG. 11, if the number of times of executing the reboot (Crb) is greater than the set criterion of failure, the processing proceeds to step S1109. On the other hand, if the number of times of executing the reboot (Crb) is equal to or smaller than the set criterion of failure, the flow chart in FIG. 11 is ended.

In the present exemplary embodiment, in step S1109, the CPU 102 switches the setting of the automatic power-off function to OFF. In step S1110, the CPU 102 notifies the user accordingly. However, a setting screen for switching to turning off of the automatic-OFF drive may be displayed instead of the display in step S1110 to ask the user to turn off the automatic-OFF drive. In a case of this setting, if the user switches the automatic power-off function to turning off, the subsequent reboot is not repeated. Thereby, the user can recognize and execute the switching the automatic power-off function to turning off (the nullification of the automatic power-off function).

As described above, in the present exemplary embodiment, if the number of times of the reboot of the control circuit 10 executed in a case where the power switch is not turned off for a predetermined time period after the automatic power-off function (the power-off drive) is booted exceeds a predetermined number of times and the reboot thereof is repeated twice or more, it is determined that the power switch 133 fails. In that case, the control circuit 10 forcibly switch s the setting of the automatic power-off function of the image forming apparatus 1 to OFF to inform the user accordingly, allowing inhibiting the repetition of reboot of the control circuit 10 due to the failure in the power switch.

According to the present invention, even if the power-OFF cannot be executed for some reason when the automatic power-OFF function is executed by the power switch provided with the mechanical relay, the user can be notified accordingly or the reason to allow avoiding the freeze state of the apparatus or the repetitive occurrence of the similar state. In other words, in a case where the automatic power-OFF function of the power switch is executed, failure in the apparatus occurring in a case where the power switch-OFF drive cannot be executed can be inhibited.

The image forming apparatus is described above as an example of the information processing apparatus according to the present invention, however, the information processing apparatus according to the present invention is not limited to the image forming apparatus, but may be other information processing apparatuses. It is to be understood that the configuration of the aforementioned various data and the contents thereof are not limited to these, but the various data are formed of various configurations and contents according to applications and purposes.

Exemplary embodiments have been described above, the present invention may take form in a system, an apparatus, a method, a program, and a storage medium, for example, as the exemplary embodiment. More specifically, the present invention may be applied to a system formed of a plurality of apparatuses or a system formed of an apparatus.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-022838 filed Feb. 6, 2012, which is hereby incorporated by reference herein in its entirety.

What is claimed is:

1. An information processing apparatus comprising:
a mechanical switch configured to be operated by a user and to be moved between ON-state and OFF-state;
a driving unit configured to move the mechanical switch from the ON-state to the OFF-state; and
a control unit configured, in a case where a predetermined condition for shutting down the information processing apparatus is satisfied, to control the driving unit to automatically move the mechanical switch from the ON-state to the OFF-state, and, in a case where the mechanical switch has not been moved from the ON-state to the OFF-state within a predetermined amount of time since the control unit controlled the driving unit to automatically move the mechanical switch from the ON-state to the OFF-state, to reboot the information processing apparatus.

2. The information processing apparatus according to claim 1, wherein the control unit controls the driving unit to automatically move the mechanical switch from the ON-state to the OFF-state a predetermined number of times without rebooting the information processing apparatus, and then the control unit controls again the driving unit to automatically move the mechanical switch from the ON-state to the OFF-state, and
wherein the reboot of the information processing apparatus is performed in a case where the mechanical switch has not been moved from the ON-state to the OFF-state within the predetermined amount of time since the control unit controlled again the driving unit to automatically move the mechanical switch from the ON-state to the OFF-state.

3. The information processing apparatus according to claim 1, wherein the control unit executes shutdown preparation processing of the information processing apparatus before controlling the driving unit to automatically move the mechanical switch from the ON-state to the OFF-state in the case where the predetermined condition for shutting down the information processing apparatus is satisfied.

4. The information processing apparatus according to claim 1, wherein the mechanical switch is a toggle mechanical switch that switches between the ON-state where power is supplied to the information processing apparatus and the OFF-state where the supply of power to the information processing apparatus is cut off.

5. The information processing apparatus according to claim 4, wherein the driving unit is a solenoid which moves the mechanical switch from the ON-state to the OFF-state.

6. The information processing apparatus according to claim 5, wherein the control unit switches between the supply and the cutoff of power to the solenoid.

7. The information processing apparatus according to claim 1, further comprising:
a timer for transmitting an interruption signal to the control unit,
wherein the reboot of the information processing apparatus is performed in a case where the control unit controls the driving unit to automatically move the mechanical switch from the ON-state to the OFF-state and then receives the interruption signal from the timer.

8. The information processing apparatus according to claim 1, wherein the predetermined condition is a lapse of a predetermined time period without receiving a job or a lapse of a predetermined time period without a user operating an operation panel.

9. The information processing apparatus according to claim 1, further comprising:
a display unit configured, if the information processing apparatus is rebooted, to display information indicating that the supply of power to the information processing apparatus is not cut off by the control unit controlling the driving unit to automatically move the mechanical switch from the ON-state to the OFF-state.

10. The information processing apparatus according to claim 9, wherein the display unit is configured, if the information processing apparatus is rebooted a predetermined number of times, to display information to ask a user to turn off an automatic power-off function of the information processing apparatus.

11. A method for controlling an information processing apparatus that includes a mechanical switch configured to be operated by a user and to be moved between ON-state and OFF-state, the method comprising:
in a case where a predetermined condition for shutting down the information processing apparatus is satisfied, supplying power to a solenoid to automatically move the mechanical switch from the ON-state to the OFF-state; and
in a case where the mechanical switch has not been moved from the ON-state to the OFF-state within a predetermined amount of time since the supplying of the power to the solenoid to automatically move the mechanical switch from the ON-state to the OFF-state, rebooting the information processing apparatus.

12. The method according to claim 11, wherein the predetermined condition is a lapse of a predetermined time period without receiving a job or a lapse of a predetermined time period without a user operating an operation panel.

13. The information processing apparatus according to claim 3, wherein the shutdown preparation processing includes at least one of processing for stopping supplying power to a unit capable of communicating with the control unit, processing for stopping communication with a unit capable of communicating with the control unit and processing for performing backup of data stored in a volatile memory.

14. The information processing apparatus according to claim 1, further comprising:
a reset unit configured to output, to the control unit, a reset signal to reboot the information processing apparatus.

15. The method according to claim 11, wherein the supplying of the power to the solenoid to automatically move the mechanical switch from the ON-state to the OFF-state comprises supplying again power to the solenoid to automatically move the mechanical switch from the ON-state to the OFF-state after having supplied power to the solenoid to automatically move the mechanical switch from the ON-state to the OFF-state a predetermined number of times without rebooting the information processing apparatus, and wherein the rebooting of the information processing apparatus comprises rebooting the information processing apparatus in a case where the mechanical switch has not been moved from the ON-state to the OFF-state within the predetermined amount of time since the supplying again of the power to the solenoid to automatically move the mechanical switch from the ON-state to the OFF-state.

16. The method according to claim 11, further comprising:

executing shutdown preparation processing of the information processing apparatus before the supplying of the power to the solenoid to automatically move the mechanical switch from the ON-state to the OFF-state in the case where the predetermined condition for shutting down the information processing apparatus is satisfied.

17. The method according to claim 16, wherein the shutdown preparation processing includes at least one of processing for stopping supplying power to a unit capable of communicating with a control unit of the information processing apparatus, processing for stopping communication with a unit capable of communicating with the control unit and processing for performing backup of data stored in a volatile memory.

18. The method according to claim 11, wherein the mechanical switch is a toggle mechanical switch that switches between the ON-state where power is supplied to the information processing apparatus and the OFF-state where the supply of power to the information processing apparatus is cut off.

19. The method according to claim 11, wherein the information processing apparatus includes a control unit that switches between the supply and the cutoff of power to the solenoid.

20. The method according to claim 11, further comprising:

after the supplying of the power to the solenoid to automatically move the mechanical switch from the ON-state to the OFF-state, receiving an interruption signal from a timer, wherein the rebooting of the information processing apparatus comprises rebooting the information processing apparatus based on the receiving the interruption signal from the timer after the supplying of the power to the solenoid to automatically move the mechanical switch from the ON-state to the OFF-state.

21. The method according to claim 11, further comprising:

if the information processing apparatus is rebooted, displaying information indicating that the supply of power to the information processing apparatus is not cut off by the supplying of the power to the solenoid to automatically move the mechanical switch from the ON-state to the OFF-state.

22. The method according to claim 21, further comprising:

if the information processing apparatus is rebooted a predetermined number of times, displaying information to ask a user to turn off an automatic power-off function of the information processing apparatus.

23. The method according to claim 11, further comprising:

in the case where the mechanical switch has not been moved from the ON-state to the OFF-state within the predetermined amount of time since the supplying of the power to the solenoid to automatically move the mechanical switch from the ON-state to the OFF-state, receiving a reset signal, wherein the rebooting of the information processing apparatus comprises rebooting the information processing apparatus based on the reset signal.

24. A non-transitory computer-readable medium storing instructions that, when executed by one or more processors of an information processing apparatus that includes a mechanical switch configured to be operated by a user and to be moved between ON-state and OFF-state, cause the information processing apparatus to perform operations comprising:

in a case where a predetermined condition for shutting down the information processing apparatus is satisfied, supplying power to a solenoid to automatically move the mechanical switch from the ON-state to the OFF-state; and in a case where the mechanical switch has not been moved from the ON-state to the OFF-state within a predetermined amount of time since the supplying of the power to the solenoid to automatically move the mechanical switch from the ON-state to the OFF-state, rebooting the information processing apparatus.

25. A method for controlling an information processing apparatus that includes a mechanical switch and a driving unit, the mechanical switch configured to be operated by a user and to be moved between ON-state and OFF-state, the driving unit configured to move the mechanical switch from the ON-state to the OFF-state, the method comprising:

in a case where a predetermined condition for shutting down the information processing apparatus is satisfied, controlling the driving unit to automatically move the mechanical switch from the ON-state to the OFF-state; and in a case where the mechanical switch has not been moved from the ON-state to the OFF-state within a predetermined amount of time since the controlling the driving unit to automatically move the mechanical switch from the ON-state to the OFF-state, rebooting the information processing apparatus.

* * * * *